United States Patent
Wachholz et al.

(10) Patent No.: US 11,148,211 B2
(45) Date of Patent: Oct. 19, 2021

(54) METHOD FOR OPERATING A CORE DRILLING MACHINE, AND CORE DRILLING MACHINE AND CORE DRILL BIT FOR CARRYING OUT THE METHOD

(71) Applicant: C. & E. Fein GmbH, Schwaebisch Gmuend-Bargau (DE)

(72) Inventors: Karsten Wachholz, Schwaebisch Gmuend (DE); Christian Kreb, Winterbach (DE); Jackob Seemann, Muehlacker (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 16/876,645

(22) Filed: May 18, 2020

(65) Prior Publication Data
US 2020/0361008 A1   Nov. 19, 2020

(30) Foreign Application Priority Data
May 16, 2019  (DE) ..................... 10 2019 112 999.0

(51) Int. Cl.
*B23B 49/00*  (2006.01)
*B23B 51/04*  (2006.01)

(52) U.S. Cl.
CPC ........ *B23B 49/001* (2013.01); *B23B 51/0406* (2013.01); *B23B 2270/36* (2013.01); *B23B 2270/48* (2013.01); *Y10T 408/21* (2015.01)

(58) Field of Classification Search
CPC .............. B23B 49/001; B23B 2270/36; B23B 2270/48; Y10T 408/21
See application file for complete search history.

(56) References Cited

U.S. PATENT DOCUMENTS

| 5,895,177 | A | * | 4/1999 | Iwai ...................... B23B 49/001 408/1 R |
| 5,940,787 | A | * | 8/1999 | Gelston ................. B23B 49/001 702/134 |
| 7,210,878 | B2 | | 5/2007 | Koslowski et al. |
| 7,431,682 | B2 | | 10/2008 | Zeiler et al. |

(Continued)

FOREIGN PATENT DOCUMENTS

| DE | 2906892 A1 | * | 9/1980 | ........... B23B 49/001 |
| DE | 103 04 405 A1 | | 8/2004 | |

(Continued)

*Primary Examiner* — Eric A. Gates
(74) *Attorney, Agent, or Firm* — Muncy, Geissler, Olds & Lowe, P.C.

(57) ABSTRACT

A method for operating an electric core drilling machine, in particular a magnetic core drilling machine, comprising the steps: identification of a core drill bit detachably connected to the core drilling machine, by means of an information carrier associated with the core drill bit and an information receiver associated with the core drilling machine; detection of a load quantity of the core drill bit; determination of a wear value of the core drill bit on the basis of the value of the load quantity; issuance of an error value when the wear value exceeds a wear limit value; as well as issuance of a signal to indicate the necessity of replacing and/or repairing the core drill bit. In addition, the invention relates to a core drilling machine and a core drill bit for carrying out the method.

14 Claims, 2 Drawing Sheets

(56) References Cited

U.S. PATENT DOCUMENTS

| | | | |
|---|---|---|---|
| 7,523,678 B2 * | 4/2009 | Turrini | G05B 19/4065 |
| | | | 702/9 |
| 10,953,510 B2 * | 3/2021 | Pereira | B23B 49/001 |
| 2009/0175694 A1 | 7/2009 | Craig et al. | |
| 2017/0274489 A1 * | 9/2017 | Baratta | B24B 49/02 |
| 2018/0178293 A1 * | 6/2018 | Yamamoto | B23K 20/12 |
| 2018/0297126 A1 * | 10/2018 | Drexl | B23B 51/0406 |
| 2020/0391306 A1 * | 12/2020 | Clausi | B24D 5/06 |

FOREIGN PATENT DOCUMENTS

| | | | |
|---|---|---|---|
| EP | 165745 A * | 12/1985 | |
| EP | 597310 A1 * | 5/1994 | |
| EP | 3 299 100 A1 | 3/2018 | |
| FR | 2368336 A1 * | 5/1978 | B23B 47/34 |

* cited by examiner

METHOD FOR OPERATING A CORE DRILLING MACHINE, AND CORE DRILLING MACHINE AND CORE DRILL BIT FOR CARRYING OUT THE METHOD

This nonprovisional application claims priority under 35 U.S.C. § 119(a) to German Patent Application No. 10 2019 112 999.0, which was filed in Germany on May 16, 2019, and which is herein incorporated by reference.

BACKGROUND OF THE INVENTION

Field of the Invention

The present invention relates to a method for operating a core drilling machine. In addition, the invention relates to a core drilling machine and a core drill bit for carrying out the method.

Description of the Background Art

In order to drill large-diameter holes in steel plates or steel beams, handheld power drills with a twist drill normally are not used, but instead core drilling machines with a core drill bit. These core drilling machines in this case are mounted on the workpiece by means of a magnetic base, and are then driven automatically or manually. Because of the core drill bit, which has the shape of a hollow cylinder, it is not necessary here for the material of the entire hole diameter to be drilled out, but instead only a hollow cylinder is ultimately cut out by the cutting edge of the core drill bit. The cylindrical remainder then falls out of the steel plate or is lodged in the core drill bit. However, it has proven problematic in core drilling machines that the core drill bits used are subject to very high wear due to the heat that develops, and consequently have only a limited service life. However, it is very difficult in this regard for the user to recognize when the cutting performance of the core drill bit is diminishing, and thus when it is ultimately necessary to replace or resharpen it. Moreover, there are a multiplicity of different core drill bits, all of which differ from one another with regard to their service lives. For instance, the service life is predominantly influenced by the diameter of the core drill bit and by the material used to form the core drill bit or its cutting edge. In addition, the individual core drill bits have different optimal operating parameters. Deviating therefrom results in increased wear and longer process times.

SUMMARY OF THE INVENTION

It is therefore an object of the present invention to provide an improved operating method for a core drilling machine. It is an additional object of the present invention to provide an improved core drilling machine and an improved drill bit with which the method according to the invention can be carried out.

In an exemplary embodiment, a method is provided for operating an electric core drilling machine that includes the following steps: identification of a core drill bit detachably connected to the core drilling machine, by means of an information carrier associated with the core drill bit and an information receiver associated with the core drilling machine; detection of a load quantity of the core drill bit; determination of a wear value of the core drill bit on the basis of the value of the load quantity; issuance of an error value when the wear value exceeds a wear limit value; and/or Issuance of a signal to indicate the necessity of replacing and/or repairing the core drill bit.

In this way, an operating method is ultimately provided by means of which the core drill bit being used in the core drilling machine is automatically identified. Because the load quantity of the core drill bit is detected, a wear value can be determined on the basis of the value of this load quantity. If this wear value then exceeds the wear limit value, then the error value is issued with which it can be indicated to the user that he must replace the core drill bit and exchange it for a new core drill bit. The wear limit value can also be explicitly reached significantly before the end of the lifetime of the core drill bit in this context, in order to communicate to the user by means of the signal that will soon have to take care of the replacement of the core drill bit. This information can also be used to have a new or repaired core drill bit sent to the user automatically before the core drill bit currently in use reaches its maximum lifetime, if this information is transmitted to the manufacturer. This can take place within the framework of a leasing or subscription model. The identification of the core drill bit in use here especially preferably takes place simultaneously with the insertion of the core drill bit into a tool holder, but can also take place before or after this. Especially in the case of high quality core drill bits, repair is also possible in this context, by resharpening the cutting edge. In this context, along with a serial number or other piece of information with which the core drill bit can be identified, it is also possible, in particular, to store all production parameters on the information carrier. In this way, it is possible to access the production lot, the production date, the worker, and the manufacturing location in the event of reorders or complaints.

It has also proven beneficial here when the identification of the core drill bit on the core drilling machine takes place by means of NFC, RFID, and/or Bluetooth. In this way, contactless identification of the core drill bit on the core drilling machine is made possible, which has a positive effect on the user-friendliness of the operating method according to the invention. The term "RFID" in this context includes both the UHF (868 MHz) and HF (13.56 MHz) variants. Alternatively, provision is also made within the scope of the invention that the identification takes place by means of a bar code that constitutes the information carrier and a corresponding scanner that serves as the information receiver.

It has also proven especially advantageous when an at least one operating parameter of the core drilling machine is matched to the core drill bit in use. This can be, in particular, the speed of the core drilling machine. In this way, the progress of work is optimized, since the core drilling machine can always operate in the optimal speed range. Moreover, the lifetime of the core drill bit in use can also be increased in this way. The coolant feed should be understood as an operating parameter, as well.

It has also proven worthwhile, moreover, when the optimal feed is indicated and/or set as a function of the core drill bit in use. This takes into account, in particular, that different core drill bits have different optimal feeds, so that it is possible to either set the feed to the optimal value, which is possible in the case of an automatic feed, or to indicate the optimal value or deviations therefrom to the user, by which means the work result and the performance are improved.

It has also proven to be beneficial when the wear value is determined through a comparison between the detected value of the load quantity and monitoring data that are stored in a memory. It is thus possible, for example by means of a comparative measurement, for the wear behavior of different core drill bits to first be detected individually and then stored in the memory. If the core drilling machine is now used with one of these core drill bits, then the wear value can be inferred automatically from the comparison between the value of the load quantity and the monitoring value.

It has also proven advantageous when the load quantity is selected from a group that includes the operating hours, the cumulative power consumption, the curve of current draw of the core drilling machine, the total advance of the core drilling machine, and/or the number of holes drilled. These load values can be detected in an especially simple manner here.

In addition, it has proven worthwhile when the signal is transmitted by means of a transmitter of the core drilling machine to a receiver. In particular, the error value and/or the value of the load quantity can be transmitted in this case. Alternatively and/or in addition, the error value and/or the value of the load quantity is stored in a memory unit of the core drilling machine. It has also proven worthwhile in this context when the value of the load quantity and/or the error value is read out by the user. The signal can also be audible or visual, however. Provision is also made within the scope of the invention here that the value of the load quantity and/or the wear value are transmitted and/or indicated to the user continuously or as needed. For example on a smart phone.

The object relating to the core drilling machine is attained according to the invention by a core drilling machine comprising an electric drive with which a tool holder can be rotationally driven, in which holder a core drill bit can be detachably mounted, an information receiver for identification of the core drill bit, a sensor for detection of a load quantity of the core drill bit, an analysis unit for determining a wear value of the core drill bit on the basis of the value of the load quantity, and an output unit for output of an error value when a wear limit value is exceeded. In this way, a core drilling machine is provided that makes it possible in an especially simple way to identify, and to detect the wear of, the core drill bit in use.

It has also proven especially worthwhile in this design when the sensor is designed to detect the operating hours, the cumulative power consumption, the curve of current draw of the core drilling machine, the total advance of the core drilling machine, and/or the number of holes drilled. In this way, a load quantity acting on the core drill bit is detected reliably.

It has also proven beneficial when the information receiver is arranged on a magnetic base of the core drilling machine, on a support bracket of the core drilling machine, or on a housing of the core drilling machine. It has proven especially worthwhile in this context when the information receiver in this design is arranged such that the identification of the core drill bit takes place upon insertion into the tool holder, which prevents the situation that the user connects a first core drill bit to the core drilling machine, but then inserts a second core drill bit into the tool holder and works with that bit.

The object relating to the core drill bit is attained according to the invention by a core drill bit comprising a distal first end with a cutting edge and a proximal second end with a shank for connecting the core drill bit to a core drilling machine, wherein an information carrier identifying the core drill bit is associated with the shank. In this way, a core drill bit is created that can be identified in an appropriate core drilling machine in order to be able to monitor the wear of the core drill bit.

It has also proven advantageous here when the information carrier is designed as an annular, passive transmitter that is accommodated in a recess formed at the proximal end of the shank. In this way, the information carrier, which is formed as a passive RFID transmitter, for example, can be securely accommodated on the shank. The information carrier can be glued into the recess in this case.

It has also proven especially worthwhile in this case when the recess is implemented as an annular groove. In this way, damage to the information carrier is avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
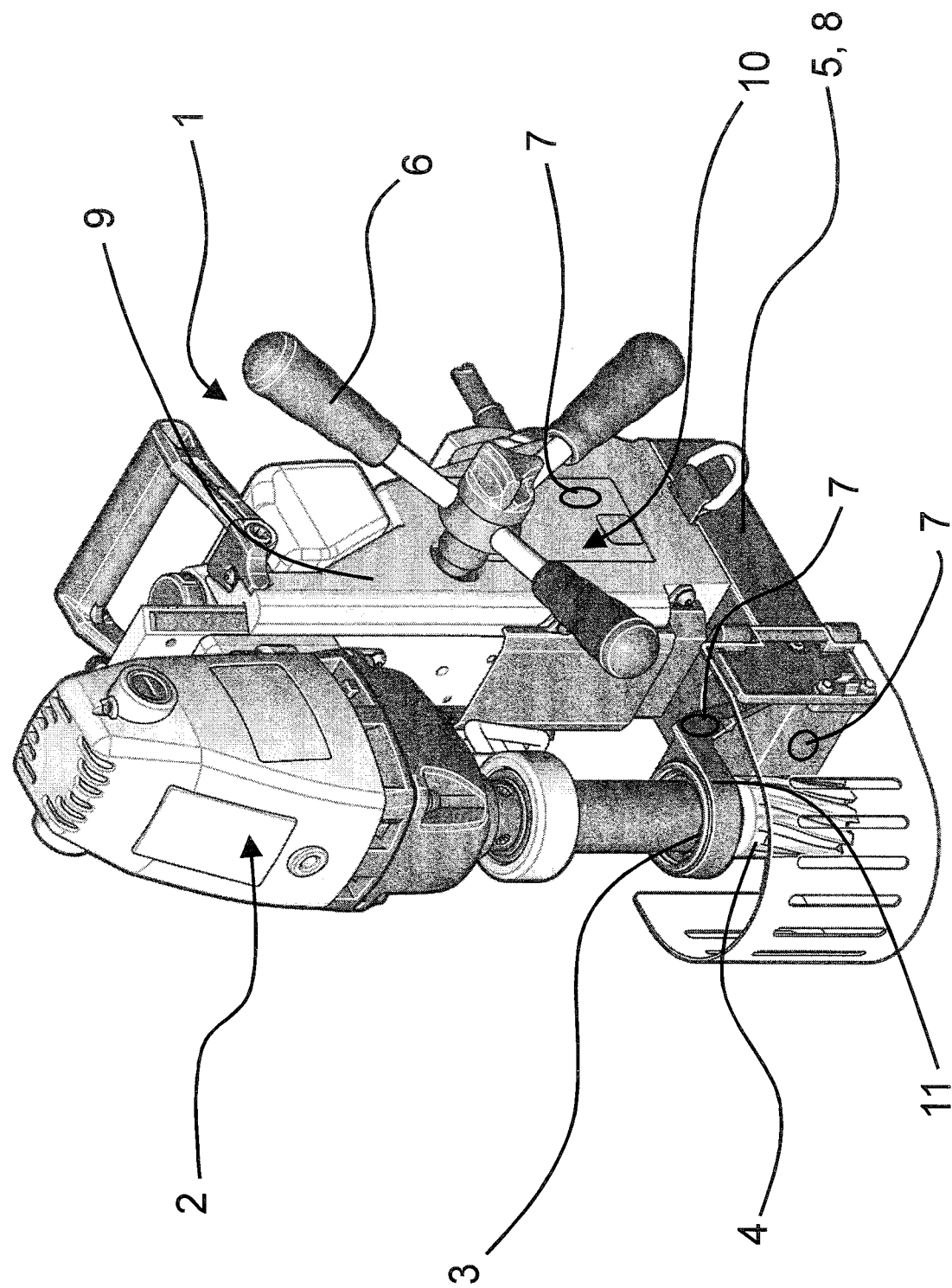
FIG. 1 is a perspective view of a core drilling machine according to the invention.

FIG. 1 shows, in a perspective view, a core drilling machine 1, which includes an electric drive 2 with which a tool holder 3 can be rotationally driven. Detachably mounted in the tool holder 3 is a core drill bit 4. By means of a magnetic base 5, the core drilling machine 1 can be mounted on a workpiece to be processed. By means of a handwheel 6, the section of the core drilling machine 1 that includes the drive 2 and the tool holder 3 are moved axially relative to an electronics section 10 containing the electronics. An information receiver 7 for identification of the core drill bit 4 is contained in the core drilling machine 1. This receiver can be mounted at various points on the core drilling machine 1 in this design. The arrangement of the information receiver 7 on a magnet 8 of the magnetic base 5, on a housing 9 of the electronics section 10, and on a support bracket 11 is shown by way of example in the figure. It should be explicitly noted that it is sufficient for the identification of the core drill bit 4 to use only one of the information receivers 7 shown. In the exemplary embodiment shown, the schematically indicated information receivers 7 are implemented as RFID antennas with which it is possible to detect the information carriers 12 associated with the core drill bits 4, which information carriers are implemented as passive RFID transmitters. Arranged in the core drilling machine 1 is a sensor that serves to detect a load quantity of the core drill bit 4, and detects the operating hours, the cumulative power consumption, the curve of current draw of the core drilling machine 1, the total advance of the core drilling machine 1, and/or the number of holes drilled. A wear value of the core drill bit 4 can be determined on the basis of the value of the load quantity with an analysis unit. If the wear value exceeds a wear limit value, then an error value is output through an output unit, and a signal is generated in order to inform the user that he will soon have to replace the core drill bit 4.

Figure 2:
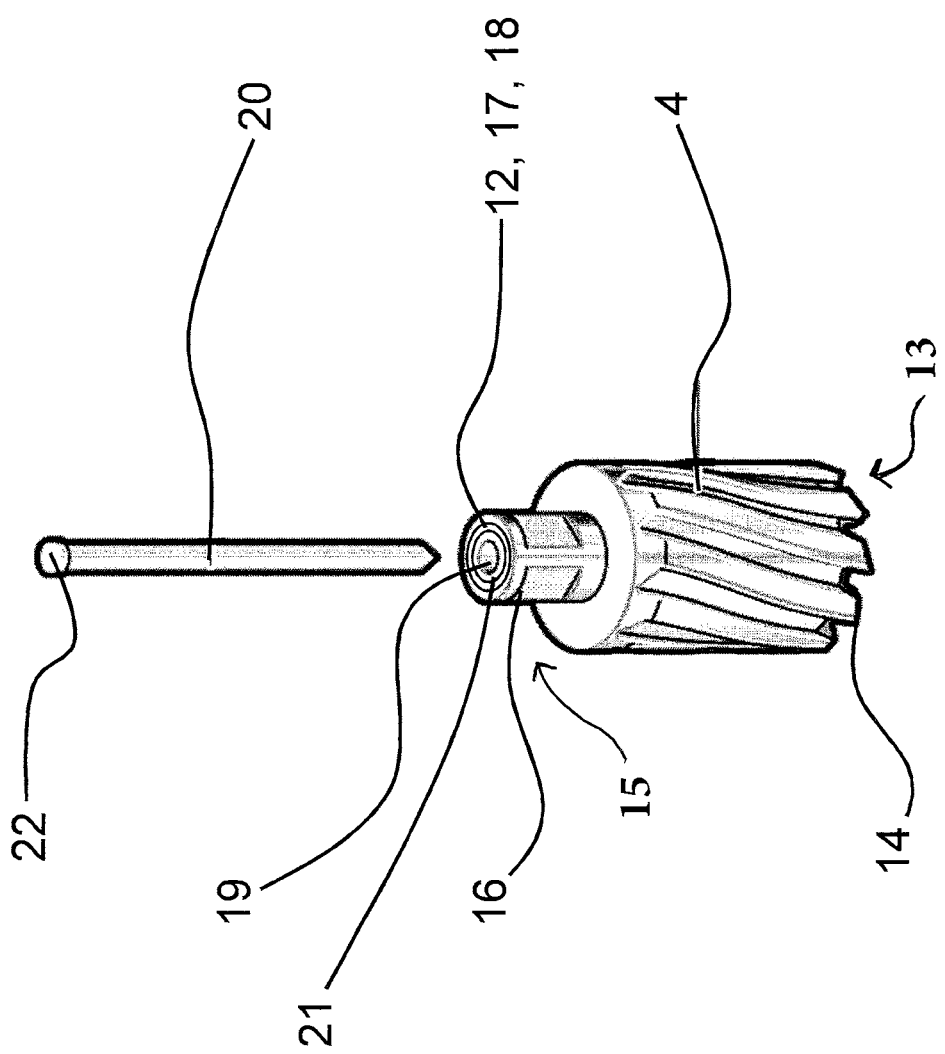
FIG. 2 is a perspective view of a core drill bit according to the invention.

FIG. 2 shows the core drill bit 4 in a perspective view. This bit has a distal—which is to say facing away from the tool holder 3—first end 13 with a cutting edge 14, and a proximal—which is to say facing the tool holder 3—second end 15 with a shank 16 for connecting the core drill bit 4 to a core drilling machine 1. An information carrier 12 identifying the core drill bit 4 is associated with the shank 16 here. In the exemplary embodiment shown, this carrier is designed as an annular, passive RFID transmitter that is accommodated in a recess 17 formed at the proximal end of the shank 16. The recess 17 is implemented in this design as an annular groove 18, into which the information carrier 12 is inserted. As is customary for core drill bits 4, the one shown in the drawing likewise has a central through-hole 19, into which an axially movable guide pin 20 is inserted. In order to prevent shielding of the information carrier 12 by the guide pin 20, when the pin is in the inserted state its head 22 rests on an edge 21 formed by the recess 17.

Below, the method according to the invention for operating a core drilling machine 1 is described in detail once again on the basis of the core drilling machine 1 shown in FIG. 1. First, the core drill bit 4 accommodated in the tool holder 3 of the core drilling machine 1 is identified by means of an information carrier 12 associated with the core drill bit 4 and an information receiver 7 associated with the core drilling machine 1. If the information receiver 7 is arranged on the magnet 8 of the magnetic base 5, then the identification takes place when the user inserts the core drill bit 4 into the tool holder 3 of the core drilling machine 1, since in this process the core drill bit 4 is moved past the information receiver 7 contained in the magnet 8, and is identified when this occurs. During operation, a load quantity of the core drill bit 4 is then detected, and a wear value is determined on the basis of the value of the load quantity. This is accomplished by a comparison between the value of the detected load quantity and previously determined monitoring data stored in a memory. If this wear value exceeds a wear limit value, then an error value is output, and then as the final step a signal is output to the user that indicates to him that it is necessary to replace or repair, which is to say for instance to resharpen, the core drill bit 4. In this process, this signal is sent from the core drilling machine 1 to a receiver by means of a transmitter. In the exemplary embodiment shown, the identification of the core drill bit 4 on the core drilling machine 1 takes place by means of RFID. In addition to the wear monitoring, at least one operating parameter of the core drilling machine 1 is matched to the core drill bit 4 in use and the optimal feed is set for the relevant core drill bit 4 in use.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an electric core drilling machine, the method comprising:
    identifying a core drill bit detachably connected to the core drilling machine via an information carrier associated with the core drill bit and an information receiver associated with the core drilling machine;
    detecting a load quantity of the core drill bit;
    determining a wear value of the core drill bit based on a value of the load quantity;
    providing an error value when the wear value exceeds a wear limit value; and
    providing a signal to indicate the necessity of replacing and/or repairing the core drill bit.

2. The method according to claim 1, wherein the identification of the core drill bit on the core drilling machine takes place via NFC, RFID, and/or Bluetooth.

3. The method according to claim 1, wherein at least one operating parameter of the core drilling machine is matched to the core drill bit in use.

4. The method according to claim 3, wherein an optimal feed is indicated and/or set as a function of the core drill bit in use.

5. The method according to claim 1, wherein the wear value is determined through a comparison between the value of the detected load quantity and monitoring data that are stored in a memory.

6. The method according to claim 1, wherein the load quantity includes: operating hours, cumulative power consumption, curve of current draw of the core drilling machine, a total advance of the core drilling machine, and/or a number of holes drilled.

7. The method according to claim 1, wherein the signal is transmitted from the core drilling machine to a receiving device of a user via a transmitter.

8. A core drilling machine comprising:
    an electric drive with which a tool holder is adapted to be rotationally driven, and in which holder a core drill bit is detachably mounted;
    an information receiver for identification of the core drill bit;
    a sensor for detection of a load quantity of the core drill bit;
    an analysis unit for determining a wear value of the core drill bit based on a value of the load quantity; and
    an output unit for output of an error value when a wear limit value is exceeded to indicate the necessity of replacing and/or repairing the core drill bit.

9. The core drilling machine according to claim 8, wherein the sensor is designed to detect operating hours, a cumulative power consumption, a curve of current draw of the core drilling machine, a total advance of the core drilling machine, and/or a number of holes drilled.

10. The core drilling machine according to claim 8, wherein the information receiver is arranged on a magnet of the core drilling machine, on a support bracket of the core drilling machine, or on a housing of the core drilling machine.

11. The core drilling machine according to claim 8, wherein the core drill bit comprises a distal first end with a cutting edge and a proximal second end with a shank for connecting the core drill bit to the core drilling machine, wherein an information carrier identifying the core drill bit is associated with the shank.

12. The core drilling machine according to claim 11, wherein the information carrier is designed as an annular, passive transmitter that is accommodated in a recess formed at a proximal end of the shank.

13. The core drilling machine according to claim 12, wherein the recess is implemented as an annular groove.

14. The core drilling machine according to claim 8, wherein the sensor is designed to detect operating hours, a cumulative power consumption, a total advance of the core drilling machine, and/or a number of holes drilled.

* * * * *